(12) United States Patent
Belik (10) Patent No.: US 9,242,303 B2
(45) Date of Patent: Jan. 26, 2016

(54) CUTTING DEVICE ON MOVEABLE PLATFORM

(75) Inventor: Jaroslav Belik, Pearland, TX (US)

(73) Assignee: National Oilwell Varco, L.P., Houston, TX (US)

( * ) Notice: Subject to any disclaimer, the term of this patent is extended or adjusted under 35 U.S.C. 154(b) by 583 days.

(21) Appl. No.: 13/695,549

(22) PCT Filed: May 3, 2011

(86) PCT No.: PCT/US2011/035076
§ 371 (c)(1),
(2), (4) Date: Oct. 31, 2012

(87) PCT Pub. No.: WO2011/140154
PCT Pub. Date: Nov. 10, 2011

(65) Prior Publication Data
US 2013/0051950 A1    Feb. 28, 2013

Related U.S. Application Data (60) Provisional application No. 61/330,581, filed on May 3, 2010.

(51) Int. Cl.
*B23C 1/20* (2006.01)
*B23C 3/02* (2006.01)
*E21B 41/00* (2006.01)

(52) U.S. Cl.
CPC . *B23C 3/02* (2013.01); *E21B 41/00* (2013.01); *B23C 1/20* (2013.01); *B23C 2215/64* (2013.01); *B23C 2220/52* (2013.01); *Y10T 409/303808* (2015.01); *Y10T 409/306664* (2015.01); *Y10T 409/307056* (2015.01)

(58) Field of Classification Search
CPC ............... B23C 1/20; B23C 2220/52; Y10T 409/30756; Y10T 409/307616; Y10T 409/307672; Y10T 409/308232; Y10T 409/306384; Y10T 409/30644
USPC ............................. 409/199–200, 178–179
See application file for complete search history.

(56) References Cited

U.S. PATENT DOCUMENTS

| | | | |
|---|---|---|---|
| 2,808,765 A | 10/1957 | Gunderson | |
| 2,816,487 A | 12/1957 | Armitage et al. | |
| 3,175,465 A * | 3/1965 | Fuller et al. | 409/132 |
| 3,370,491 A | 2/1968 | Cross | |
| 3,526,167 A * | 9/1970 | Francisco | 409/74 |

(Continued)

FOREIGN PATENT DOCUMENTS

| | | |
|---|---|---|
| CN | 2400236 | 10/2000 |
| DE | 3106612 A * | 9/1982 |

(Continued)

OTHER PUBLICATIONS

International Application No. PCT/US2011/035076 Search Report and Written Opinion dated Feb. 9, 2012.

(Continued)

*Primary Examiner* — Daniel Howell
(74) *Attorney, Agent, or Firm* — Conley Rose, P.C.

(57) ABSTRACT

A cutting or milling machine with an end mill is mounted on a moveable platform, wherein the platform is moveable by a mechanical assembly to put the end mill through a circular motion apart from the rotational motion imparted by the milling machine.

14 Claims, 5 Drawing Sheets

(56) References Cited

U.S. PATENT DOCUMENTS

| | | | |
|---|---|---|---|
| 3,603,204 A * | 9/1971 | Anderson et al. | 409/179 |
| 3,802,316 A * | 4/1974 | Bohm et al. | 409/175 |
| 3,823,626 A | 7/1974 | Bakewell | |
| 4,261,675 A | 4/1981 | Zankl | |
| 4,573,840 A * | 3/1986 | Skrentner | 409/200 |
| 4,597,700 A | 7/1986 | Woolington et al. | |
| 4,786,219 A * | 11/1988 | Oberlin et al. | 409/84 |
| 4,836,725 A | 6/1989 | Horsky et al. | |
| 5,080,538 A | 1/1992 | Schmitt | |
| 5,197,836 A * | 3/1993 | Crivellin | 409/200 |
| 5,674,169 A | 10/1997 | Yang | |
| 5,713,253 A | 2/1998 | Date et al. | |
| 5,769,575 A | 6/1998 | Stofflet et al. | |
| 6,663,327 B2 * | 12/2003 | Linderholm et al. | 409/190 |
| 6,719,505 B2 * | 4/2004 | Linderholm et al. | 409/191 |
| 7,189,038 B2 * | 3/2007 | Stuxberg et al. | 409/200 |
| 7,347,652 B2 | 3/2008 | Giovanelli et al. | |
| 7,351,018 B2 * | 4/2008 | Oden et al. | 409/131 |
| 8,152,421 B2 * | 4/2012 | Yagishita | 409/132 |
| 2008/0093125 A1 | 4/2008 | Potter et al. | |
| 2008/0286060 A1 | 11/2008 | Aho et al. | |

FOREIGN PATENT DOCUMENTS

| | | | |
|---|---|---|---|
| DE | 3447292 A * | 6/1986 | |
| EP | 0898051 A1 | 2/1999 | |
| JP | 62120957 A * | 6/1987 | |
| JP | 01222809 A * | 9/1989 | |
| JP | 06226698 A * | 8/1994 | |
| JP | 11114759 A * | 4/1999 | |

OTHER PUBLICATIONS

CIPO Office Action dated Nov. 6, 2014 for Canadian Patent Application No. 2,798,236 filed May 3, 2011.

* cited by examiner

CUTTING DEVICE ON MOVEABLE PLATFORM

CROSS-REFERENCE TO RELATED APPLICATIONS

This application is the U.S. National Stage under 35 U.S.C. §371 of International Patent Application No. PCT/US2011/035076 filed May 3, 2011, which claims the benefit of U.S. Provisional Application No. 61/330,581, filed May 3, 2010, entitled "Standard Press with End Mill on Moveable Platform."

STATEMENT REGARDING FEDERALLY SPONSORED RESEARCH OR DEVELOPMENT

Not applicable.

BACKGROUND

The present disclosure relates generally to milling, drilling, or otherwise cutting metal using a press machine, sometimes also called a standard press, a drill press, or a mill drill. More particularly, the present disclosure relates to a press machine having an end cutter, such as a mill or drill, that is positionable adjacent an oilfield tubular, such as those tubulars sent into a drilled well bore for exploration and production of hydrocarbons.

The drilling and production of earthen well bores for the recovery of hydrocarbons involves many processes, including storing, handling, and tracking drill pipe or other tubulars at the surface and then delivery of those tubulars into the well bore. Because the drilled well bores may be thousands of feet in length, many tubulars must be connected together to drill or otherwise access the well bores. It may be necessary to keep track of the tubulars through identification devices coupled to the tubulars. It may also be necessary to communicate with the tubulars while in the well bore using the identification or other communication devices coupled to the tubulars. An example of such an identification and/or communication device is a radio frequency identification (RFID) tag. It is preferable to couple the RFID tags and other such devices into precise pockets or voids in the tubulars. Other reasons also exist for creating precise pockets or voids in the tubulars.

SUMMARY

Accordingly, there is a need to mill, drill or otherwise cut pockets, voids or openings into a target object such as oilfield tubulars. Though reference is made to oilfield tubulars as the object receiving the milled or drilled pocket, the principles disclosed herein are also applicable to other members requiring similar pockets or voids. Other advantages may be obtained if such a cutting system or device was compact, portable, and/or self-contained, or otherwise suited for use on a drilling rig or other locations where space and power is limited, and the environment may be harsh.

In some embodiments, a cutting system includes a cutting machine to rotate an end mill, a moveable platform, wherein the cutting machine is mounted on the moveable platform, and a mechanical assembly rotatably coupled to the moveable platform to impart a circular motion to the end mill. The system may further include a motor to drive the mechanical assembly. The cutting machine may rotate the end mill and move the end mill vertically apart from the circular motion. The mechanical assembly may include a sprocket coupled to a shaft. The mechanical assembly may include an eccentric bushing coupled to the sprocket and the shaft. The bushing may be off-center from the shared axis of the sprocket and the shaft. The eccentric bushing may be rotatably coupled to the platform to move the platform in the circular motion about the axis. The system may further include a pivot arm system supporting the cutting system. The pivot arm system may be self-adjusting to maintain a relationship between the end mill and a cutting object.

In some embodiments, a cutting system includes a milling machine to rotate an end mill, a stationary platform supporting a drive assembly, a moveable platform supporting the milling machine, and a mechanical assembly coupled between the stationary platform and the drive assembly, and the moveable platform, wherein the drive assembly is operable to actuate the mechanical assembly to move the moveable platform and the milling machine relative to the stationary platform. The mechanical assembly may be rotatably coupled to the drive assembly and the stationary platform, and eccentrically rotatably coupled to the moveable platform. The drive assembly may be coupled to a sprocket, the sprocket is coupled to an eccentric bushing, and the eccentric bushing is rotatably coupled to the moveable platform. The system may further include a self-adjusting pivot arm system supporting the cutting system such that the end mill maintains a substantially perpendicular relationship to a cutting object.

In some embodiments, a method for milling a void in an object includes rotating an end mill with a cutting machine, vertically adjusting the end mill with respect to the object, and circling the end mill while rotating and vertically adjusting with a mechanical assembly to mill the void. The method wherein the void is larger than the end mill. The method further including rotating an eccentric bushing on a shaft in the mechanical assembly to circle the end mill.

Thus, embodiments described herein comprise a combination of features and advantages intended to address various shortcomings associated with certain prior devices, systems, and methods. The various characteristics described above, as well as other features, will be readily apparent to those skilled in the art upon reading the following detailed description, and by referring to the accompanying drawings.

BRIEF DESCRIPTION OF THE DRAWINGS

For a more detailed description of the disclosed embodiments, reference will now be made to the accompanying drawings, wherein.

DETAILED DESCRIPTION OF THE PREFERRED EMBODIMENTS

In the drawings and description that follow, like parts are typically marked throughout the specification and drawings with the same reference numerals, respectively. Certain terms are used throughout the description and claims to refer to particular features or components. As one skilled in the art will appreciate, different persons may refer to the same feature or component by different names. This document does not intend to distinguish between components or features that differ in name but not function. The drawing figures are not necessarily to scale. Certain features and components may be shown exaggerated in scale or in somewhat schematic form and some details of conventional elements may not be shown in the interest of clarity and conciseness. The present invention is susceptible to embodiments of different forms. Specific embodiments are described in detail and are shown in the drawings, with the understanding that the present disclosure is to be considered an exemplification of the principles of the invention, and is not intended to limit the invention to that illustrated and described herein. It is to be fully recognized that the different teachings of the embodiments discussed below may be employed separately or in any suitable combination to produce desired results.

The terms "including" and "comprising" are used in an open-ended fashion, and thus should be interpreted to mean "including, but not limited to . . . . " Unless otherwise specified, any use of any form of the terms "couple", "attach", "connect" or any other term describing an interaction between elements is not meant to limit the interaction to direct interaction between the elements and may also include indirect interaction between the elements described. Thus, if a first device couples to a second device, that connection may be through a direct connection, or through an indirect connection via other devices, components, and connections. In addition, as used herein, the terms "axial" and "axially" generally mean along or parallel to a central axis (e.g., central axis of a body or a port), while the terms "radial" and "radially" generally mean perpendicular to the central axis. For instance, an axial distance refers to a distance measured along or parallel to the central axis, and a radial distance means a distance measured perpendicular to the central axis. Reference to up or down will be made for purposes of description with "up", "upper", "upwardly" or "upstream" meaning toward the surface of the well and with "down", "lower", "downwardly" or "downstream" meaning toward the terminal end of the well, regardless of the well bore orientation. The various characteristics mentioned above, as well as other features and characteristics described in more detail below, will be readily apparent to those skilled in the art upon reading the following detailed description of the embodiments, and by referring to the accompanying drawings.

For purposes of the following description, the object receiving the pocket or void is an oilfield tubular, though it is understood that other objects may also receive the pocket or void in locations other than the oilfield.

Figure 1:
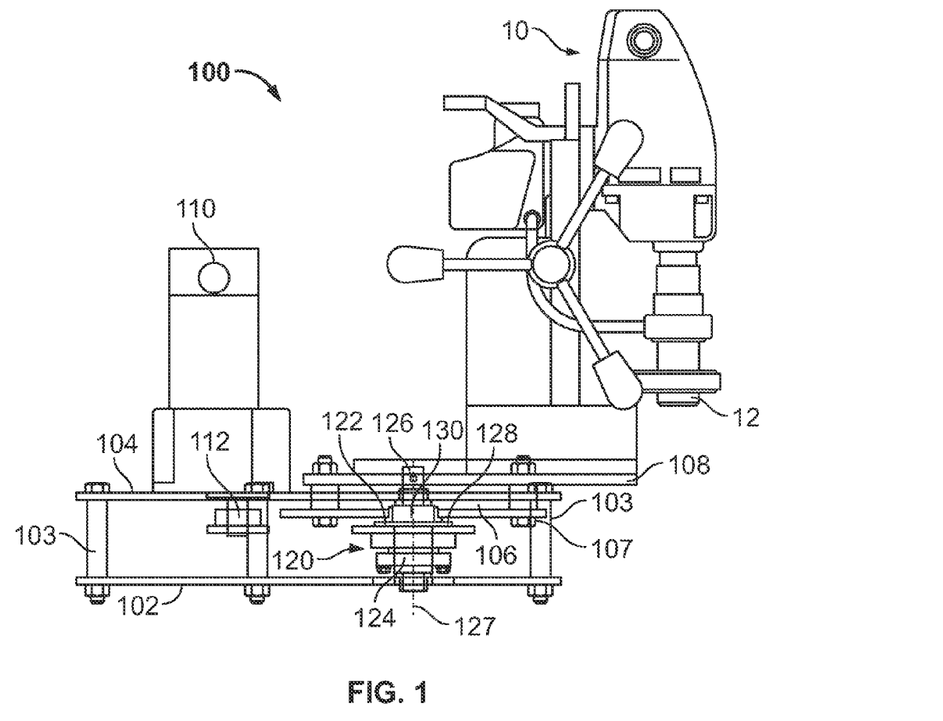
FIG. 1 is an elevation view of a milling system with a moveable platform in accordance with the principles disclosed herein.

Referring now to FIG. 1, a side view of a system 100 having a milling or cutting device 10 on a moveable platform 106, 108 is shown. The system 100 includes a standard press 10 with an end mill 12. In additional embodiments, device 10 can be other cutting devices such as a drill press, a mill drill, a milling machine, and other press machines. In some embodiments, the cutter can be an end mill 12 as shown, while in other embodiments the cutter can be other milling cutters, a drill bit, or other cutters. However, it is preferred in some embodiments to include an end mill 12 because an end mill may cut with its end surface as well as its side surfaces. Further, an end mill does most of its cutting at its outermost diameters of the head, so the constant speed at which the cutting is taking place provides precise cutting. An end mill is less dependent on cutting toward the center of the mill head, where the speed is lower. Also, an end mill is adapted for cutting in horizontal directions relative to its longitudinal axis. A drill bit, on the other hand, may have disadvantages because it is designed for vertical cutting up and down along its longitudinal axis. The cutting speed at the center of the drill bit is zero, while the maximum speed is at the outer diameter of the drill bit head. Because a drill bit is not always cutting at its outer diameter, the cutting speed is not precise, while an end mill is almost always cutting at its maximum diameter and a constant and precise speed.

The end mill 12 can be used to mill a void as big as the diameter of the end mill head. However, it may be necessary to mill a very precise circular void or pocket that is larger than the diameter of the end mill, as shown with the milled void 14 and the end mill head 12 in FIG. 2. In some embodiments, the milled void 14 requires three movements: vertical movement of the end mill 12 along its axis, or relative to the object being milled, orbital or horizontal movement of the end mill relative to its axis, or relative to the object being milled, and the rotational movement or speed of the mill about its axis. The embodiments to be described below capture these movements to mill voids or pockets into tubulars and other target objects.

Still referring to FIG. 1, the press or milling machine 10 of system 100 is mounted on an upper moveable plate or platform 108. The plate 108 is coupled to a lower moveable plate or platform 106 by bolt assemblies 107 extending through oversized holes 109 in an upper stationary plate 104. The upper stationary plate 104 is bolted to a lower stationary plate 102 with bolt assemblies 103. A motor 110 is mounted on top of the upper stationary plate 104.

A sprocket and eccentric bushing assembly 120 is disposed between and among the plates 102, 104, 106, 108 as shown. A sprocket or gear 122 is supported about a shaft 126 and rotatably coupled at coupling 124 in the lower stationary plate 102. The shaft 126 and sprocket 122 also support an eccentric bushing 130 and bushing base plate 128.

Figure 2:
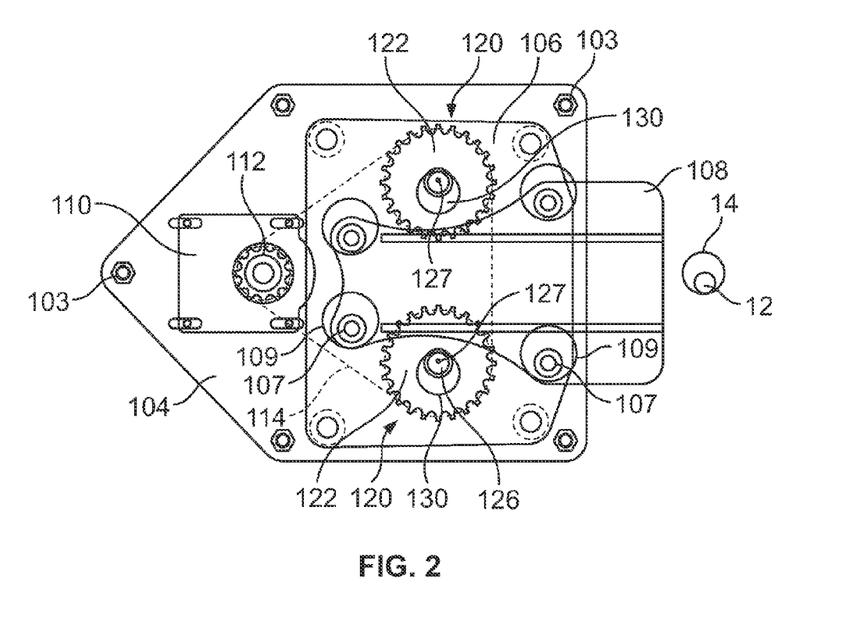
FIG. 2 is a top view of the milling system of FIG. 1.

Now with reference to FIG. 2, a pair of sprocket and eccentric gear assemblies 120 are moveably and rotatably engaged with the lower moveable plate 106 below the upper stationary plate 104. The sprockets 122 are coupled by a drive chain 114 to a drive gear 112 which is powered by the motor 110. The motor 110, drive gear 112, and drive chain 114 operate to rotate the sprockets 122 and the shafts 126 because each sprocket 122 shares a center axis of rotation 127 with each corresponding shaft 126. The bushing 130, however, is off-center or eccentric relative to the sprocket/shaft axis 127 and thus rotates eccentrically about the axis 127, as is illustrated in FIG. 2. The eccentrically rotating bushing 130 is engaged with the lower moveable plate 106 such that the plate 106 will now move in a circle about the axes 127 with the busing 130, thereby also moving the upper moveable plate 108 and the press 10 and end mill 12 mounted thereon.

Figure 3:
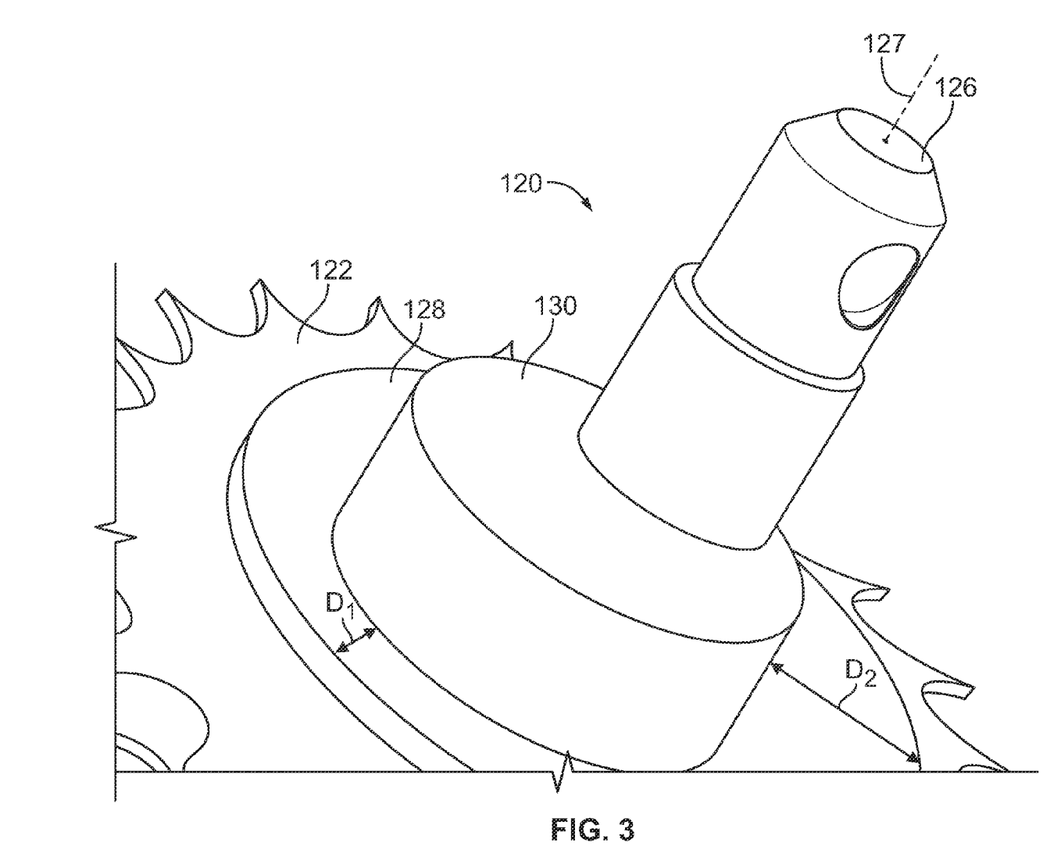
FIG. 3 is an enlarged view of a sprocket and eccentric bushing assembly of FIGS. 1 and 2.

Referring to FIG. 3, the bushing 130 is shown to be eccentric relative to the sprocket 122, the shaft 126, and their shared axis 127. The bushing 130 is positioned on the bushing base plate 128 a distance $D_1$ that is less than the distance $D_2$, illustrating the bushing 130's eccentricity.

Figure 4:
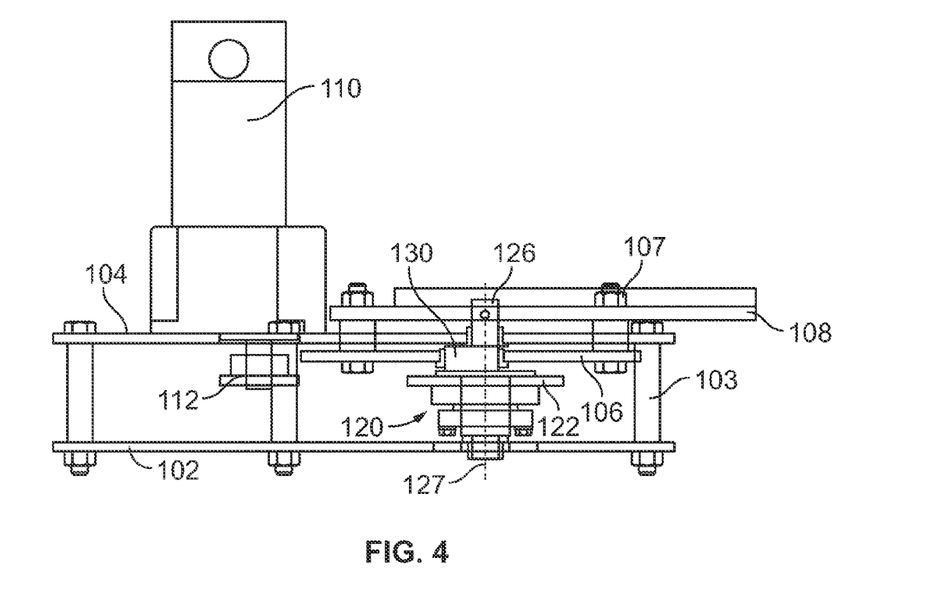
FIG. 4 is a side view of the moveable platform mechanism of FIG. 1, without the milling device, in a first position of the sprocket and eccentric bushing assembly.
Figure 5:
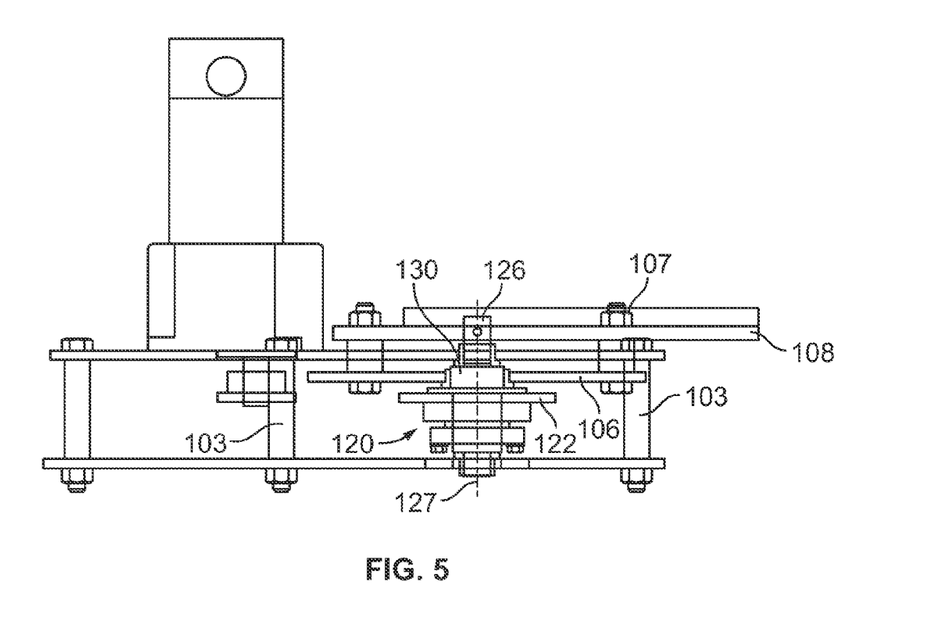
FIG. 5 is the moveable platform mechanism of FIG. 4 in second position of the sprocket and eccentric bushing assembly.

Referring now to FIG. 4, the sprocket 122 has placed the eccentric bushing 130 in a first rotational location about the axis 127, with the eccentricity of the bushing 130 clearly shown. In FIG. 5, the drive assembly has rotated the sprocket 122 approximately 90 degrees to place the eccentric bushing 130 in a second rotational location about the axis 127, which appears to be coincident with the axis 127 in the side view of FIG. 5, but which in fact is simply offset from the axis 127 in a direction into or out of the plane of the paper. This rotational or circular, eccentric movement of the bushings 130 about the axes 127 is transferred to the lower moveable plate 106 because they are moveably engaged. The same motion is then also transferred to the upper moveable plate 108 and the mill press 10, 12 via the bolts 107 extending through the oversized holes 109 in the upper stationary plate 104. As can be seen in a comparison between FIGS. 4 and 5, the plates 106, 108 and the bolts 107 have moved relative to the bolts 103.

The circular motion of the moveable plates 106, 108 then causes the end mill 12 to mill the void 14 as shown in FIG. 2. The milled void 14 diameter will be approximately the same size as the outer diameter of the orbit of the eccentric bushing 130. Thus, the bushing 130 can be adjusted or replaced to adjust the size of the milled void 14. Thus, the motor drive assembly 110, 112, 114 and the sprocket and eccentric bushing assembly 120 together move the platform 106, 108 in a circular motion. Because the press 10 and end mill 12 are mounted on the press platform 106, 108, the circular motion is transferred to the end mill 12 to mill the desired void 14. In this manner, the horizontal or orbital movement of the end mill 12 is accomplished, in addition to the vertical movement of the end mill 12 by the press 10 and the rotational speed of the end mill also provided by the press 10.

Figure 6:
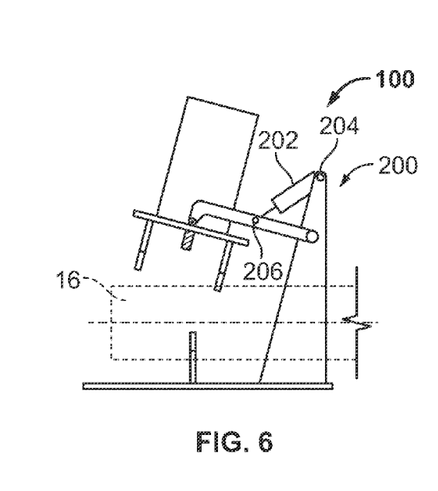
FIGS. 6-12 show various positions of embodiments of a moveable support arm for the milling systems.

As is shown, the motor 110 drives a mechanical assembly to move the end mill 12 in a horizontal circle. Further, the system 100 is compact and relatively self-contained for desirable deployment in the field. In further embodiments, the system 100 may be supported by or mounted on another system for moving, retracting, delivering, or otherwise manipulating the system 100 relative to a target object. Referring now to FIG. 6, the moveable milling system 100 is mounted on a pivot arm system 200. The combined milling system 100 and pivot arm system 200 may also be referred to as a drilling unit or drilling clamp because it is configured for deployment on a drilling rig in some embodiments. In other embodiments, the unit 100, 200 may also be deployable in other scenarios. The pivot arm system 200 includes a base member 201 having a hydraulic cylinder 202 pivotally mounted at 204. The hydraulic cylinder 202 is pivotally mounted at 206 to an arm 210. The arm 210 is pivotally mounted at 208 to the base member 201 and pivotally mounted at 212 to an upper clamp 214 supporting the system 100 and having extending clamping members 216. The base member 201 rests on a base member 220 which also includes a lower clamping member 218. In FIG. 6, the pivot arm system 200 has refracted the milling system 100 relative to a tubular 16.

Figure 7:
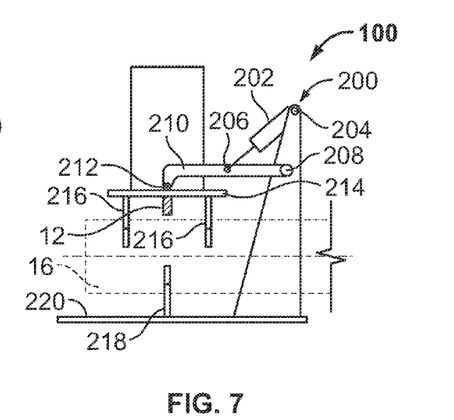
Figure 8:
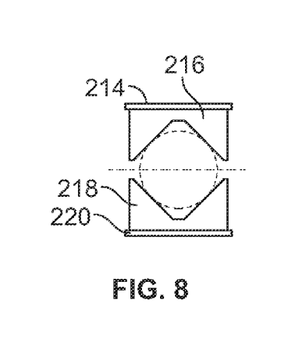
Figures 9, 10:
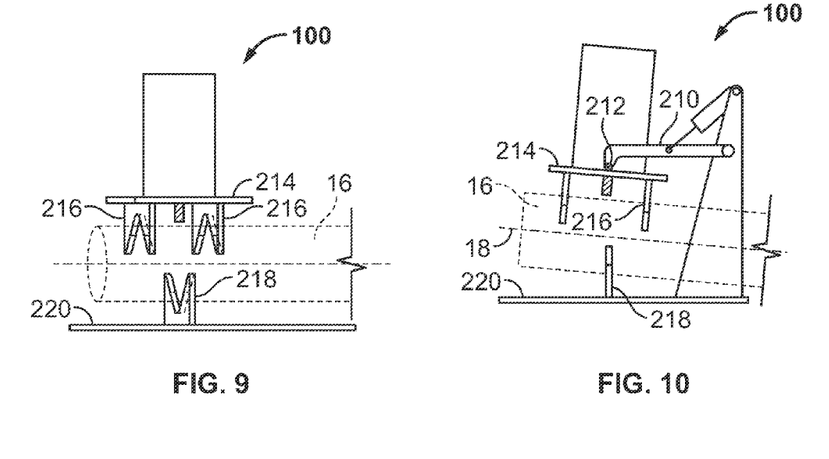

In FIG. 7, the pivot arm system 200 has lowered or extended the milling system 100 onto the tubular 16. As shown in FIGS. 8 and 9, the upper clamping members 216 work with the lower clamping members 218 to capture the tubular 16. The end mill 12 is now positioned to mill a void in tubular 16 as previously described. However, the tubular 16 may not always remain horizontal as shown, and any deviation from horizontal of the tubular 16 will affect the milling process.

Figure 11:
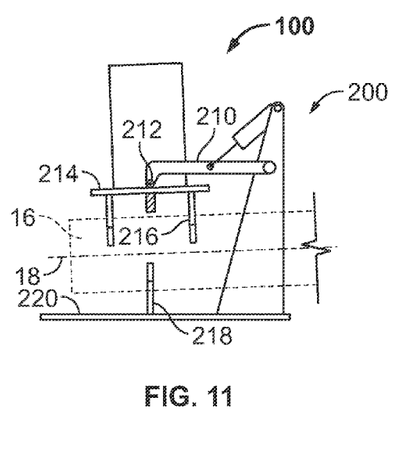

Referring now to FIGS. 10 and 11, if the tubular 16 and its axis 18 are shifted from horizontal, the upper clamp 214 is rotatable about the pivot 212 to keep both clamping members 216 engaged with the tubular 16 and the end mill at substantially vertical or perpendicular relative to the tubular 16. Also, the tubular 16 can pivot over the lower clamping member 218. The system 200 can accommodate shifting the tubular 16 in both directions, as is shown by the different positions of the tubular 16 in FIGS. 10 and 11.

Figure 12:
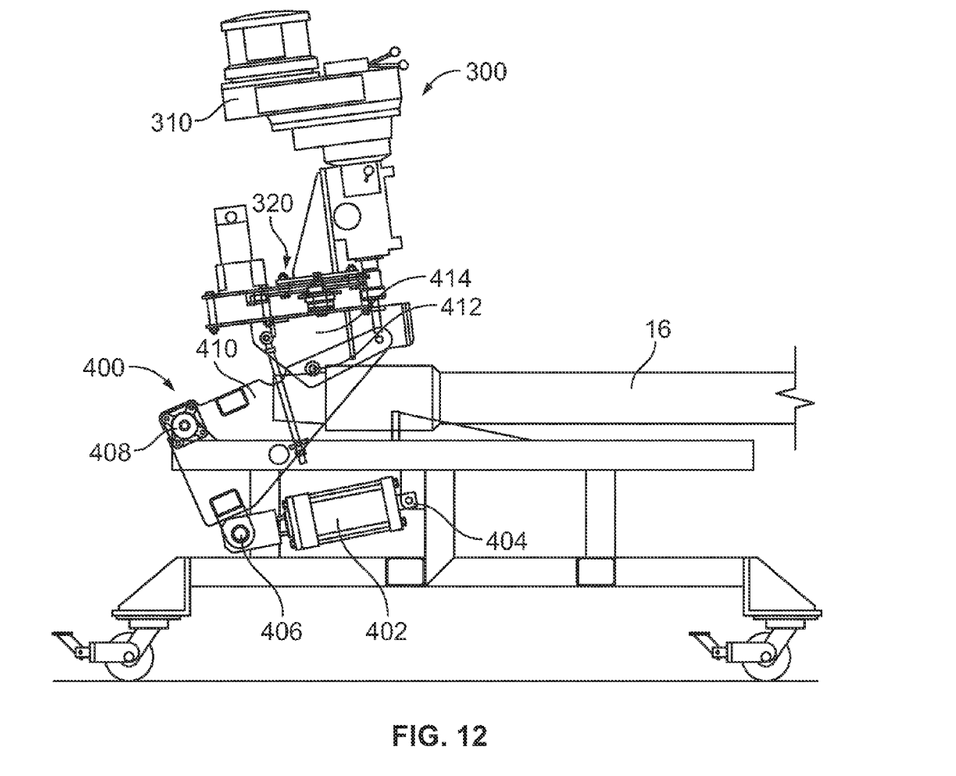

In an additional embodiment of the pivot arm system, FIG. 12 shows a pivot arm system 400 supporting a milling system 300 with a milling machine 310. The milling system 300 includes a moveable platform and an eccentric bushing assembly 320 as previously described, for milling a circular void into a tubular 16. The pivot arm system 400 includes a supporting base 401 that may be mobile on wheels 403 over a surface 20 such as a drilling rig. A hydraulic cylinder 402 is pivotally coupled to the base 401 at 404, and pivotally coupled to an arm 410 at 406. The arm 408 is pivotally coupled to the base 401 at 408, and is pivotally coupled to a milling system base 414 at 412 adjacent an end mill 312 (and/or a pivot 412).

Similar principles apply to the operation of the pivot arm system 400 as compared to the pivot arm system 200. The milling system 300 is refracted from the tubular 16 as shown in FIG. 12, but the hydraulic cylinder 402 may be actuated to pivot the arm 410 and lower the milling system 300 into perpendicular engagement with the tubular 16. If the tubular 16 should shift, the base 414 is allowed to pivot about the pivot point 412 such that upper clamping members 416 and the base 414 pivot about the lower clamping member 418 to maintain a substantially perpendicular relationship of the end mill 312 relative to the tubular 16. In some embodiments, the systems 200, 400 are self-adjusting pivot arm systems for the milling systems 100, 300.

Thus embodiments herein provide a precise milling device for milling voids in tubulars and other objects, and also provide a delivery arm system for moving and adjusting the milling device relative to the tubular or other object. The systems may be compact, portable, and/or self-contained, or otherwise suited for use on a drilling rig or other locations where space and power is limited, and the environment may be harsh. The systems provide a simple, compact, easily managed and maintained machine to mill tubulars in the field, such as on a drilling rig.

While specific embodiments have been shown and described, modifications can be made by one skilled in the art without departing from the scope or teachings herein. The embodiments as described are exemplary only and are not limiting. Many variations and modifications of the systems, apparatus, and processes described herein are possible and are within the scope of the invention. For example, the relative dimensions of various parts, the materials from which the various parts are made, and other parameters can be varied. Accordingly, the scope of protection is not limited to the embodiments described, but is only limited by the claims that follow, the scope of which shall include all equivalents of the subject matter of the claims.

What is claimed is:

1. A cutting system comprising:
   a cutting machine to rotate an end mill;
   a moveable platform, wherein the cutting machine is mounted on the moveable platform; and
   a mechanical assembly comprising an eccentric bushing, wherein the mechanical assembly is rotatably coupled to the moveable platform to impart a circular motion to the end mill.

2. The system of claim 1 further including a motor to drive the mechanical assembly.

3. The system of claim 1 wherein the cutting machine rotates the end mill and moves the end mill vertically apart from the circular motion.

4. The system of claim 1 wherein the eccentric bushing is coupled to a sprocket coupled to a shaft.

5. The system of claim 1 wherein the bushing is off-center from the shared axis of the sprocket and the shaft.

6. The system of claim 1 wherein the eccentric bushing is rotatably coupled to the platform to move the platform in the circular motion about the axis.

7. The system of claim 1 further comprising a pivot arm system supporting the cutting system.

8. The system of claim 7 wherein the pivot arm system is self-adjusting to maintain a relationship between the end mill and a cutting object.

9. A cutting system comprising:

a milling machine to rotate an end mill;

a stationary platform supporting a drive assembly;

a moveable platform supporting the milling machine;

an eccentric bushing rotatably coupled to the moveable platform; and a mechanical assembly coupled between the stationary platform and the drive assembly, and the moveable platform;

wherein the drive assembly is operable to actuate the mechanical assembly to move the moveable platform and the milling machine relative to the stationary platform.

10. The system of claim 9 wherein the mechanical assembly is rotatably coupled to the drive assembly and the stationary platform, and eccentrically rotatably coupled to the moveable platform.

11. The system of claim 9 wherein the drive assembly is coupled to a sprocket, the sprocket is coupled to the eccentric bushing.

12. The system of claim 9 further comprising a self-adjusting pivot arm system supporting the cutting system such that the end mill maintains a substantially perpendicular relationship to a cutting object.

13. A method for milling a void in an object, comprising:

rotating an end mill with a cutting machine;

vertically adjusting the end mill with respect to the object:

rotating an eccentric bushing on a shaft in the mechanical assembly to circle the end mill: and circling the end mill while rotating and vertically adjusting with a mechanical assembly to mill the void.

14. The method of claim 13 wherein the void is larger than the end mill.

\* \* \* \* \*